United States Patent
Kaku

(10) Patent No.: US 7,382,978 B2
(45) Date of Patent: Jun. 3, 2008

(54) DIGITAL CAMERA

(75) Inventor: Junya Kaku, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 230 days.

(21) Appl. No.: 10/548,383

(22) PCT Filed: Mar. 8, 2004

(86) PCT No.: PCT/JP2004/002996

§ 371 (c)(1),
(2), (4) Date: Sep. 8, 2005

(87) PCT Pub. No.: WO2004/082271

PCT Pub. Date: Sep. 23, 2004

(65) Prior Publication Data

US 2006/0171706 A1    Aug. 3, 2006

(30) Foreign Application Priority Data

Mar. 11, 2003    (JP) ............... 2003-0643693

(51) Int. Cl.
*G03B 17/00* (2006.01)
*H04N 5/76* (2006.01)

(52) U.S. Cl. .............. 396/321; 396/439; 348/231.9

(58) Field of Classification Search ......... 396/429, 396/321, 439; 348/207.99–376
See application file for complete search history.

(56) References Cited

U.S. PATENT DOCUMENTS

| | | | | |
|---|---|---|---|---|
| 5,016,107 A * | 5/1991 | Sasson et al. | ............ | 348/231.1 |
| 5,477,264 A * | 12/1995 | Sarbadhikari et al. | ... | 348/231.6 |
| 5,862,217 A * | 1/1999 | Steinberg et al. | ............ | 713/176 |
| 6,992,711 B2 * | 1/2006 | Kubo | ...................... | 348/231.7 |
| 7,023,913 B1 * | 4/2006 | Monroe | ................. | 375/240.01 |
| 2002/0001100 A1 * | 1/2002 | Kawanabe | ................. | 358/1.15 |
| 2002/0135816 A1 * | 9/2002 | Ohwa | ......................... | 358/474 |
| 2003/0035142 A1 * | 2/2003 | Kizaki | ....................... | 358/1.16 |
| 2003/0046359 A1 * | 3/2003 | Betz et al. | ................. | 709/216 |
| 2003/0063196 A1 * | 4/2003 | Palatov et al. | ........... | 348/211.2 |

FOREIGN PATENT DOCUMENTS

| | | |
|---|---|---|
| JP | 7-46525 | 2/1995 |
| JP | 11-252504 | 9/1999 |
| JP | 11-331744 | 11/1999 |
| JP | 2000-134531 | 5/2000 |
| JP | 2000-175092 | 6/2000 |
| JP | 2000-224536 | 8/2000 |
| JP | 2000-236467 | 8/2000 |

(Continued)

OTHER PUBLICATIONS

Japan Office Action dated Feb. 19, 2008.

*Primary Examiner*—W. B. Perkey
*Assistant Examiner*—Rishi S Suthar
(74) *Attorney, Agent, or Firm*—Kratz, Quintos & Hanson, LLP

(57) ABSTRACT

A digital camera includes a CPU (34). The CPU (34) is a multitasking CPU for executing in parallel an imaging task, a file recording task, and a file transmitting task. When a shutter button (32) is operated, JPEG data corresponding to an object scene is written to an SDRAM (22) by the imaging task. An image file including the JPEG data stored in the SDRAM (22) is recorded in a CF memory of a memory/LAN cartridge (30) by the file recording task. The image file recorded in the CF memory is applied to a wireless LAN card of the memory/LAN cartridge (30) by the file transmitting task.

17 Claims, 6 Drawing Sheets

FOREIGN PATENT DOCUMENTS

| JP | 2001-197429 | 7/2001 |
|----|-------------|--------|
| JP | 2002-009690 | 1/2002 |
| JP | 2002-199121 | 7/2002 |
| JP | 2002-330472 | 11/2002 |

\* cited by examiner

DIGITAL CAMERA

TECHNICAL FIELD

The present invention relates to a digital camera. More specifically, the present invention relates to a digital camera for transmitting an image signal of an imaged object scene to the outside through a communication circuit.

PRIOR ART

An example of such a kind of conventional digital camera is disclosed in Japanese Patent Laying-open No. 2002-199121 laid-open on Jul. 12, 2002. The prior art is directed to transmit image data stored in a memory unit to a home server when a digital camera comes within a radio communication area. Thus, it is possible to store the image data in the home server without performing a troublesome operation. However, in the prior art, once that transmission is started, an imaging operation is invalidated until the transmission of all the image data is completed. Thus, in the prior art, there is a problem of being short of operability.

SUMMARY OF THE INVENTION

Therefore, it is a primary object of the present invention to provide a digital camera capable of improving operability.

A digital camera according to the present invention is a digital camera that processes an image signal of an object scene imaged by an imaging means by a processor mounting a multitasking OS, and a plurality of tasks to be executed by the processor includes a first task for writing the image signal from the imaging means to an internal memory, a second task for recording the image signal stored in the internal memory in a recording medium, and a third task for applying the image signal recorded in the recording medium to a communication means.

The image signal of the object scene imaged by the imaging means is processed by the processor mounting the multitasking OS. More specifically, the image signal from the imaging means is written to the internal memory by the first task, the image signal stored in the internal memory is recorded in the recording medium by the second task, and the image signal recorded in the recording medium is applied to the communication means by the third task.

Due to the multitasking property, the first task and the third task are operated in parallel with each other. Accordingly, even if an imaging operation is performed by the imaging means at a time that the second task or the third task is activated, the image signal from the imaging means is immediately written to the internal memory by the first task. Thus, it is possible to improve operability.

It is preferable that third task includes a first transfer process for transferring the image signal recorded in the recording medium to the internal memory, and a second transfer process for transferring the image signal stored in the internal memory to the communication means.

It is noted that in a case that the third task further includes a determination process for determining whether or not it is possible to communicate by the communication process, the first transfer process and the second transfer process may be validated when the determination result by the determination means is affirmative. In this case, if it is impossible to communicate, the third task is substantially a suspended state, and only the first task and the second task becomes an execution state.

The third task may further include a restriction process for restricting the second task prior to the first transfer process, and a canceling process for canceling the restriction placed on the second task after the second transfer process. In this case, the state of the second task is controlled by the third task.

If each of the first transfer process and the second transfer process is a process to transmit a predetermined number of screens of image signals, the second task is limited by a unit of the predetermined number of screens.

In a case that the third task further includes an encryption process for performing encryption on the image file transferred to the internal memory by the first transfer process, the second transfer process is a process to transfer the image file encrypted by the encryption process to the communication means.

It is preferable that the recording medium and the communication means are housed in a detachable cartridge.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
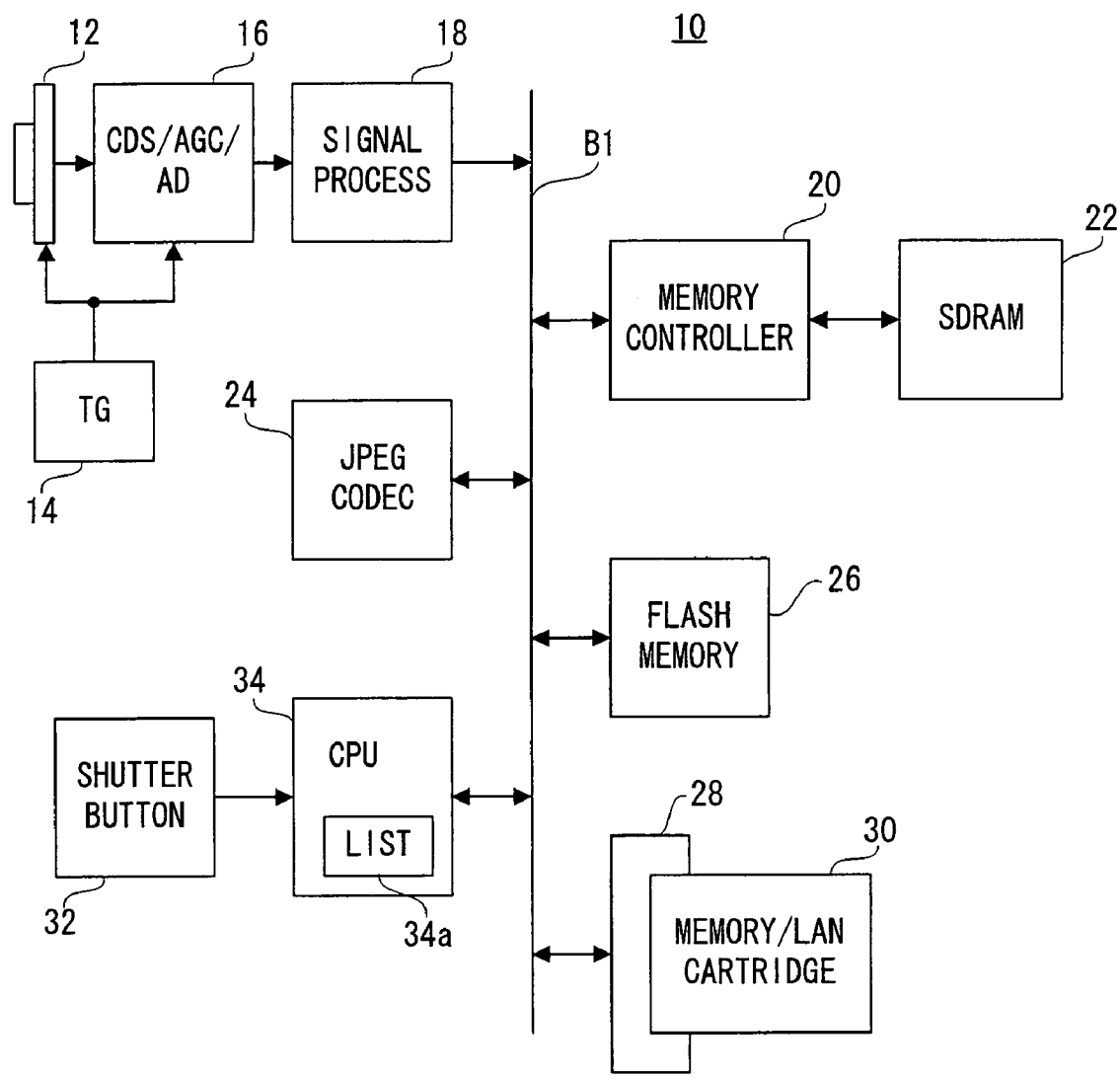
FIG. 1 is a block diagram showing one embodiment of the present invention.

Referring to FIG. 1, a digital camera 10 of this embodiment includes an image sensor 12. An optical image of an object scene is irradiated onto a light-receiving surface of the image sensor 12 via an optical lens (not shown). On the light-receiving surface, a plurality of light receiving elements (not shown) are arranged. Through the photoelectronic conversion of the light receiving elements, a raw image signal (electric charge) corresponding to the optical image of the object scene is generated.

Figure 2:
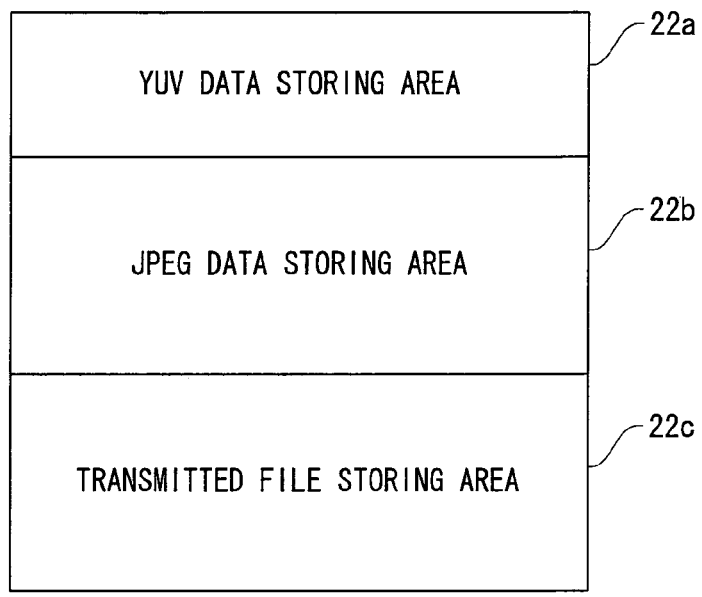
FIG. 2 is an illustrative view showing a mapping state of an SDRAM to be applied to FIG. 1 embodiment.

When a shutter button 32 is operated, an imaging process is executed. First, a CPU34 applies a reading instruction to a TG (Timing Generator) 14, applies a processing instruction to a signal processing circuit 18, and applies a compression instruction to a JPEG codec 24. The TG 14 applies a timing signal to the image sensor 12 in order to read the raw image signal generated in the light receiving elements. The raw image signal is read from the image sensor 12 in a raster scan manner, and is subjected to a series of processes such as noise rejection, gain adjustment, and A/D conversion in a CDS/AGC/AD circuit 16. The raw image data output from the CDS/AGC/AD circuit 16 is subjected to a signal process such as color separation, white balance adjustment, YUV conversion, etc. by the signal processing circuit 18. YUV data thus generated is applied to a memory controller 20 via a bus B1, and thereby written to a YUV data storing area 22a (see FIG. 2) of the SDRAM 22.

The JPEG codec 24 reads the YUV data from the YUV data storing area 22a through the bus B1 and the memory controller 20, and performs a JPEG compression on the read YUV data. Compressed YUV data thus generated, that is, JPEG data is applied to the memory controller 20 through the bus B1, and thereby written to a JPEG data storing area 22b of the SDRAM 22.

Succeeding to such an imaging process, the CPU 34 creates a file header by itself, reads the JPEG data stored in the JPEG data storing area 22b through the bus B1 and the memory controller 20, and applies an image file including the file header and the JPEG data to a memory/LAN cartridge 30 loaded into a slot 28. The image file is first recorded in a CF memory 30b (see FIG. 3) of the memory/LAN cartridge 30.

In a case a digital camera 10 is within a communication range, the image file recorded in the CF memory 30b is read by the CPU 34, and written to a transmitted file storing area 22c of the SDRAM 22 by the memory controller 30. The image file is then subjected to an encrypt process by the CPU 34, and the encrypted image file is applied to a wireless LAN card 30c of the memory/LAN cartridge 30 through the bus B1. The wireless LAN card 30c transmits the applied image file to a server (not shown) with a desired address.

Figure 3:
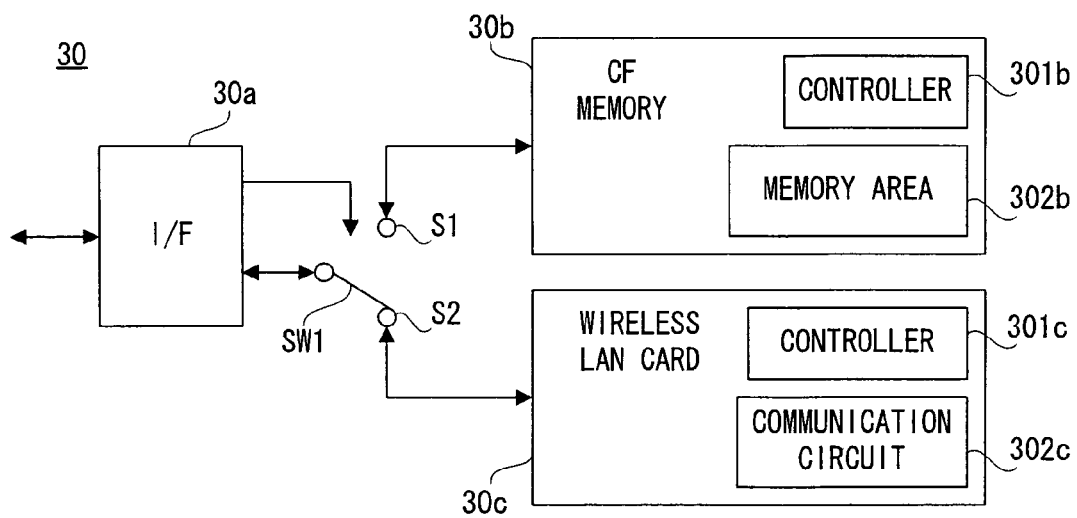
FIG. 3 is a block diagram showing one example of a memory/LAN card to be applied to FIG. 1 embodiment.

Referring to FIG. 3, the memory/LAN cartridge 30 includes an I/F 30a that is connected to the bus B1 when being attached to the slot 28. The I/F 30a connects a switch SW1 to a terminal S1 when recording the image file and when encrypting the image file, and connects a switch SW to a terminal S2 when transmitting the image file.

At a time of record, the image file input from the bus B1 is applied to the CF memory 30b via the I/F 30a and the switch SW1, and recorded in a memory area 302b by a controller 301b. At a time of encryption, the image file recorded in the memory area 302b is read by the controller 301b, and output to the bus B1 via the switch SW1 and the I/F 30a. At a time of transmission, the image file input from the bus B1 is applied to the wireless LAN card 30c via the I/F 30a and the switch SW1, and transmitted to the server with the desired address by a communication circuit 302c under the control of the controller 301c.

Figure 4:
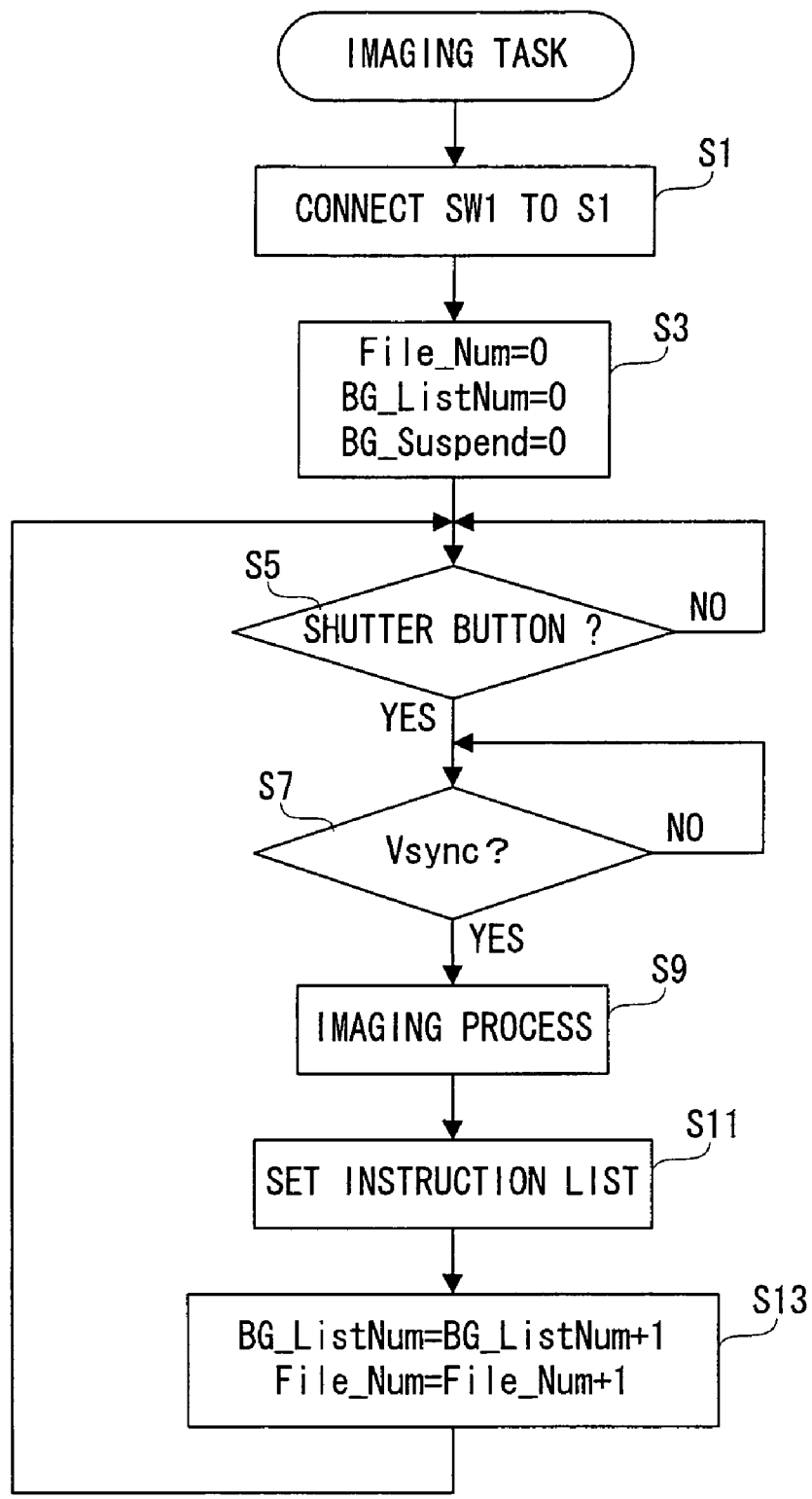
FIG. 4 is a flowchart showing a part of operation of FIG. 1 embodiment.
Figure 5:
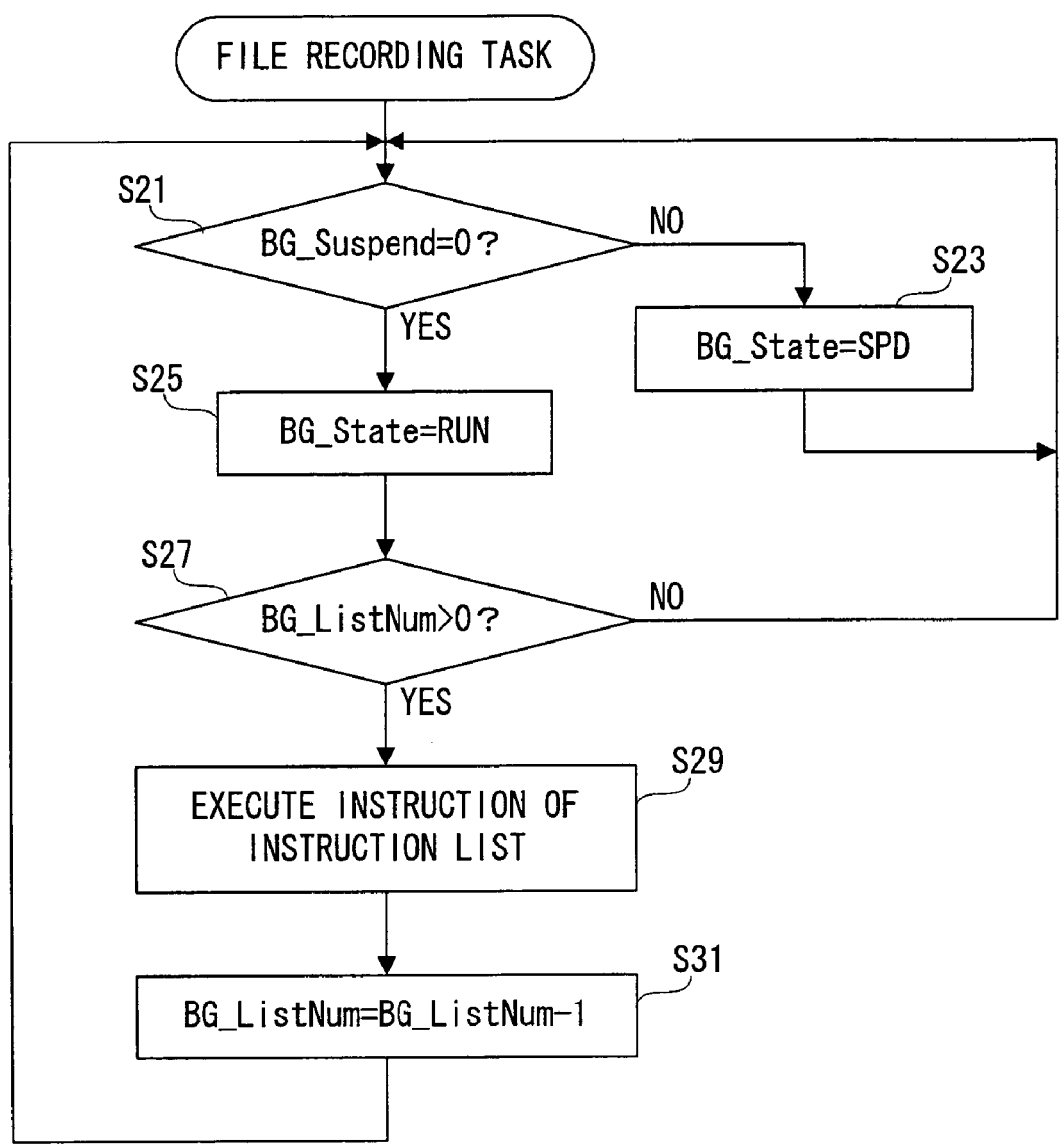
FIG. 5 is a flowchart showing another part of the operation of FIG. 1 embodiment.
Figure 6:
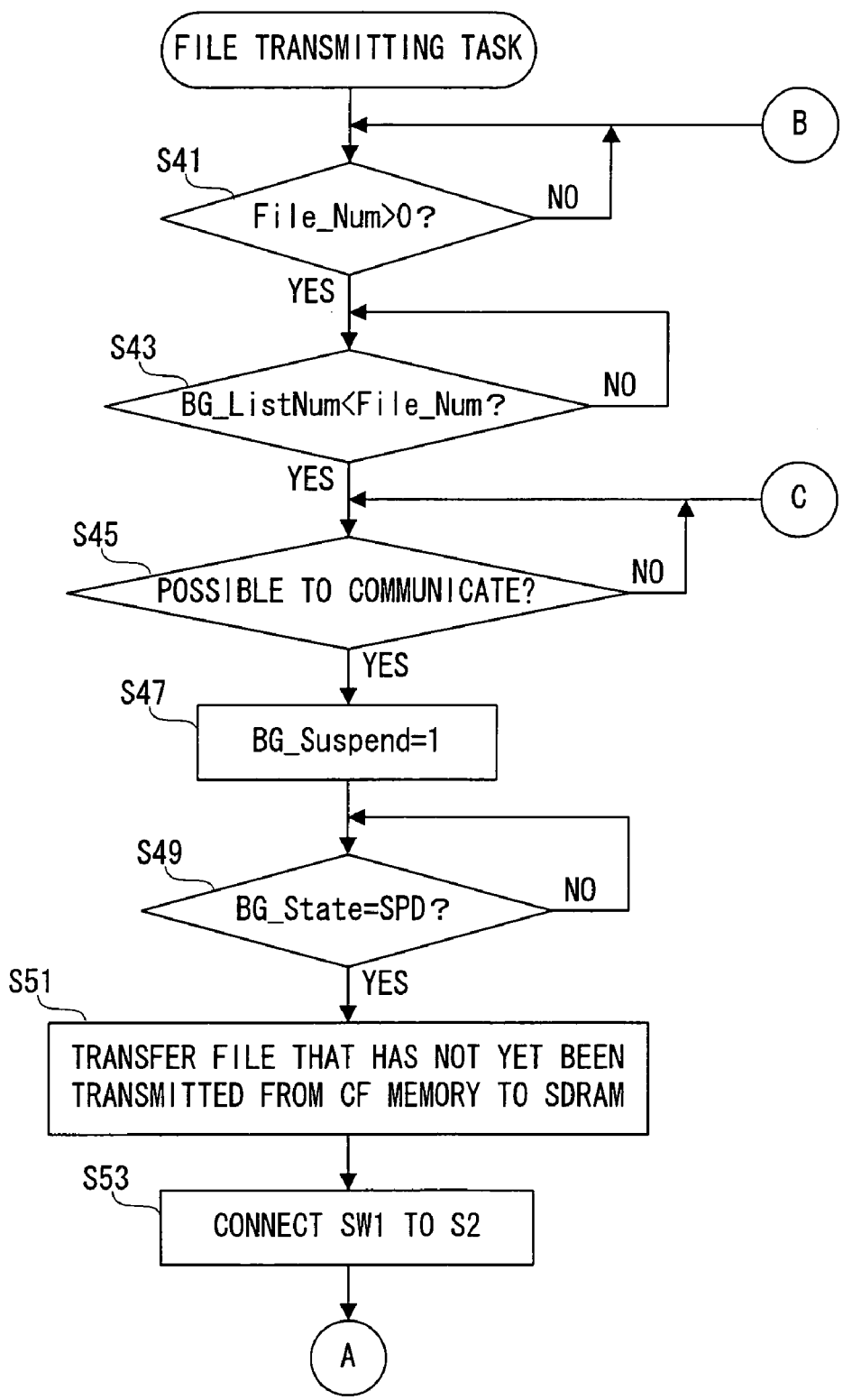
FIG. 6 is a flowchart showing the other part of the operation of FIG. 1 embodiment.
Figure 7:
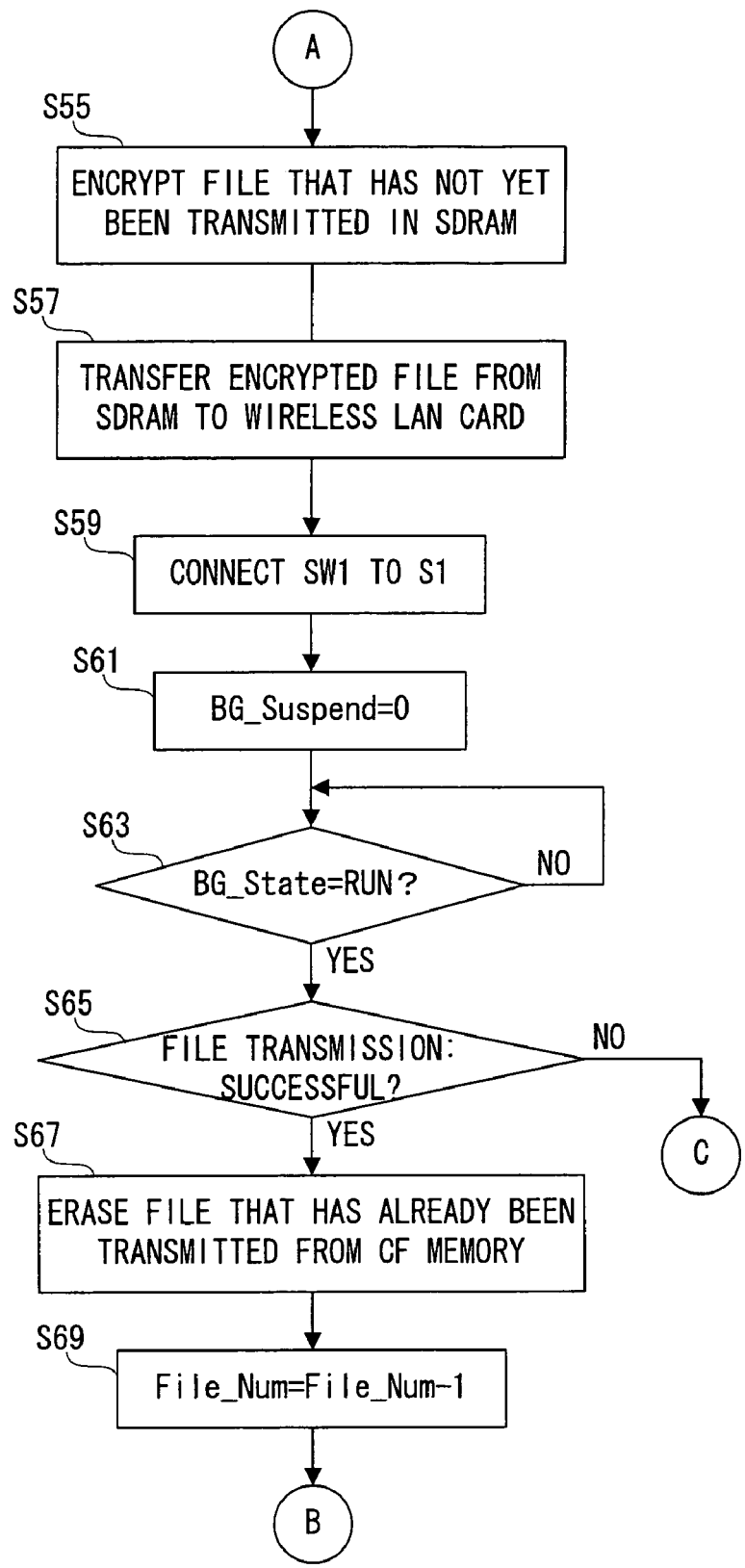
FIG. 7 is a flowchart showing a further part of the operation of FIG. 1 embodiment.

The CPU34 is a multitasking CPU mounting a multitasking OS such as the μ ITRON, and executes an imaging task shown in FIG. 4, a file recording task shown in FIG. 5, and a file transmitting task shown in FIG. 6-FIG. 7 according to a control program stored in a flash memory 26.

Referring to FIG. 4, in the imaging task, first, the switch SW1 of the memory/LAN card 30 is connected to the terminal S1 in a step S1, and "0" is set to variables File_Num, BG_ListNum, and BG_Suspend in a step S3. Here, the variable File_Num is a variable showing the number of the image files that has been created and has not been transmitted, and the variable BG_ListNum is a variable showing the number of instructions set to an instruction list 34a. Furthermore, the variable BG_Suspend is a variable showing whether or not the instruction set to the instruction list 34a is executable. The BG_Suspend=0 means "executable", and the BG_Suspend=1 means "unexecutable".

In a step S5, it is determined whether there is an operation of the shutter button 32 or not, and if YES, generation of a vertical synchronization signal is waited in a step S7 and then, an imaging process is executed in a step S9. One frame of JPEG data is reserved in the JPEG data storing area 22b of the SDRAM 22 by the imaging process. In a step S11, a recording instruction of the image file including the reserved JPEG data is set to the instruction list 34a. After completion of the setting, the variables File_Num and BG_ListNum are incremented in a step S13, and then, the process returns to the step S5.

Referring to FIG. 5, in the file recording task, first, the variable BG_Suspend is determined in a step S21. Here, if BG_Suspend=1, by regarding that it is impossible to execute the instruction set to the instruction list 34a, an identifier SPD is set to a variable BG_State in a step S23, and then, the process returns to the step S21. On the contrary thereto, if BG_Suspend=0, by regarding that the instruction set to the instruction list 34a is executable, an identifier RUN is set to the variable BG_State in a step S25, and then, the process proceeds to a step S27. It is noted that the variable BG_State is a variable for determining a state of the file recording task, and the identifier SPD shows a suspended state, and the identifier RUN shows an execution state.

In the step S27, a variable BG_ListNum is determined. Here, if BG_ListNum=0, it is regarded that the instruction to be executed is not set to the instruction list 34a, and then, the process returns to the step S21. On the contrary thereto, if BG_ListNum>0, the instruction in the instruction list 34a is executed in a step S29. The recording instruction set to the instruction list 34a by the process in the step S11 shown FIG. 4 is executed here. Thus, the JPEG data is read from the JPEG data storing area 22b of the SDRAM 22, the file header is created, and the image file including the JPEG data and the file header is applied to the CF memory 30b of the memory/LAN cartridge 30. The image file is recorded in the memory area 302b by the controller 301b. After completion of recording, in a step S31, the variable BG_ListNum is decremented, and then, the process returns to the step S21.

Referring to FIG. 6-FIG. 7, in the file transmitting task, first, a variable File_Num is determined in a step S41, the variable BG_ListNum and the variable File_Num are compared with each other in a step S43, and it is determined whether or not it is possible to communicate in a step S45. If File_Num>0, it is regarded that at least one frame of JPEG data is reserved in the JPEG data storing area 22b shown in FIG. 2. Furthermore, if BG_ListNum=File_Num, it is regarded no image file is present in the CF memory 30b, and if BG_ListNum<File_Num, at least one image file is present in the CF memory 30b. Furthermore, whether it is possible to communicate or not is determined on the basis of a radio sensitivity detected by the wireless LAN card 30c.

If File_Num>0 and BG_ListNum<File_Num are satisfied, and it is possible to communicate, "1" is set to the variable BG_Suspend in a step S47 in order to prohibit the instruction set in the instruction list 34c from being executed. When the identifier SPD is set to the variable BG_State in the step S23 shown in FIG. 5, in response thereto it is regarded that the file recording task shifts to the suspended state, and then, the process proceeds from a step S49 to the step S51. In the step S51, one image file that has been recorded in the CF memory 30b and has not yet been transmitted is transferred to the transmitted file storing area 22c of the SDRAM 22. After completion of transfer, the switch SW1 is connected to the terminal S2 in a step S53.

In a step S55, the image file stored in the transmitted file storing area 22c is encrypted, and in a succeeding step S57, the encrypted image file is transferred from the SDRAM 22 to the wireless LAN card 30c of the memory/LAN cartridge 30. The transferred image file is transmitted to the server with the desired address by the communication circuit 302c under the control of the controller 301c.

After completion of transmission, the switch SW1 is connected to the terminal S1 in a step S59, and "0" is set to the variable BG_Suspend in a step S61 in order to permit executing the instruction set to the instruction list 34a. When the identifier RUN is set to the variable BG_State in the step S25 shown in FIG. 5, in response thereto it is regarded that the file recording task shifts to the execution state, and then, the process proceeds from a step S63 to a step S65. In the step S65, it is determined whether or not the transmission process in the step S57 is successful. If "YES" here, the image file that has already been transmitted is erased from the CF memory 30b in a step S67, and the variable File_Num is decremented in a step S69, and then, the process returns to the step S41. On the contrary thereto, if "NO" is determined in the step S65, the process after the step S45 is executed once again.

As understood from the above description, when the shutter button 32 is operated, the JPEG data corresponding to the object scene is written to the SDRAM 22 by the imaging task. The image file including the JPEG data stored in the SDRAM 22 is recorded in the CF memory 30b of the memory/LAN cartridge 30 by the file recording task. The image file recorded in the CF memory 30b is applied to the wireless LAN card 30c of the memory/LAN cartridge 30 by the file transmitting task.

Here, the imaging task, the file recording task, and the file transmitting task are executed in parallel with each other. Thus, even if the shutter button 32 is operated at a time that the file recording task or the file transmitting task is activated, the imaging task is immediately executed to reserve the JPEG data corresponding to the imaged object scene in the SDRAM 22. Thus, it is possible to improve operability.

It is noted that although the JPEG compression process is executed in the imaging task in this embodiment, the JPEG compression process may be executed in the file recording task.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera that processes an image signal of an object scene imaged by an imaging means by a processor mounting a multitasking OS, wherein a plurality of tasks to be executed by said processor includes a first task for writing the image signal from said imaging means to an internal memory, a second task for recording the image signal stored in said internal memory in a recording medium, and a third task for transmitting the image signal recorded in said recording medium to a communication means,
wherein said first task, said second task, and said third task operate in parallel,
wherein said communications means is a wireless communication means, and wherein
said third task includes a firtst transfer process for transferring the image signal recorded in said recording medium to said internal memory, and a second transfer process for transferring the image signal stored in said internal memory to said communication means, and
said third task further includes a determination process for determining whether or not it is possible to communicate by said communication means, and said first transfer process and said second transfer process are validated when a determination result by said determination means is affirmative.

2. A digital camera according to claim 1, wherein said third task further includes a restriction process for restricting said second task prior to said first transfer process, and a canceling process for canceling the restriction placed on said second task after said second transfer process.

3. A digital camera according to claim 2, wherein each of said first transfer process and said second transfer process is a process transferring a predetermined number of screens of image signals.

4. A digital camera according claim 1, wherein said third task further includes an encryption process for performing encryption on the image file transferred to said internal memory by said first transfer process, and said second transfer process is a process to transfer the encrypted image file by said encryption process to said communication means.

5. A digital camera according to claim 1, wherein said recording medium and said communication means are stored in a detachable cartridge.

6. A digital camera according to claim 1, wherein said third task further includes a restriction process for restricting said second task prior to said first transfer process, and a canceling process for canceling the restriction placed on said second task after said second transfer process.

7. A digital camera according claim 1, wherein said third task further includes an encryption process for performing encryption on the image file transferred to said internal memory by said first transfer process, and said second transfer process is a process to transfer the encrypted image file by said encryption process to said communication means.

8. A digital camera according claim 2, wherein said third task further includes an encryption process for performing encryption on the image file transferred to said internal memory by said first transfer process, and said second transfer process is a process to transfer the encrypted image file by said encryption process to said communication means.

9. A digital camera according claim 3, wherein said third task further includes an encryption process for performing encryption on the image file transferred to said internal memory by said first transfer process, and said second transfer process is a process to transfer the encrypted image file by said encryption process to said communication means.

10. A digital camera according claim 6, wherein said third task further includes an encryption process for performing encryption on the image file transferred to said internal memory by said first transfer process, and said second transfer process is a process to transfer the encrypted image file by said encryption process to said communication means.

11. A digital camera according to claim 6, wherein each of said first transfer process and said second transfer process is a process transferring a predetermined number of screens of image signals.

12. A digital camera according claim 11, wherein said third task further includes an encryption process for performing encryption on the image file transferred to said internal memory by said first transfer process, and said second transfer process is a process to transfer the encrypted image file by said encryption process to said communication means.

13. A digital camera according to claim 1, wherein said recording medium and said communication means are stored in a detachable cartridge.

14. A digital camera according to claim 1, wherein said recording medium and said communication means are stored in a detachable cartridge.

15. A digital camera according to claim 2, wherein said recording medium and said communication means are stored in a detachable cartridge.

16. A digital camera according to claim 3, wherein said recording medium and said communication means are stored in a detachable cartridge.

17. A digital camera according to claim 4, wherein said recording medium and said communication means are stored in a detachable cartridge.

* * * * *

UNITED STATES PATENT AND TRADEMARK OFFICE
CERTIFICATE OF CORRECTION

PATENT NO. : 7,382,978 B2  Page 1 of 1
APPLICATION NO. : 10/548383
DATED : June 3, 2008
INVENTOR(S) : Junya Kaku It is certified that error appears in the above-identified patent and that said Letters Patent is hereby corrected as shown below:

On the title page;

In Item (30) the Foreign Application Priority Data, change: "2003-0643693", so as to read as: --2003-064369--.

Signed and Sealed this

Twenty-ninth Day of July, 2008

JON W. DUDAS
*Director of the United States Patent and Trademark Office*